(12) United States Patent
Newman et al.

(10) Patent No.: US 9,081,973 B2
(45) Date of Patent: Jul. 14, 2015

(54) RESTRICTING USER ACCESS ON SHARED COMPUTER

(75) Inventors: Nader Newman, Brampton (CA); James Shoong-Leac Chen, Brampton (CA); Timothy Fraser Pearce, Mississauga (CA)

(73) Assignee: PSION INC., Mississauga, Ontario (CA)

( * ) Notice: Subject to any disclaimer, the term of this patent is extended or adjusted under 35 U.S.C. 154(b) by 916 days.

(21) Appl. No.: 12/766,189

(22) Filed: Apr. 23, 2010

(65) Prior Publication Data

US 2011/0265179 A1    Oct. 27, 2011

(51) Int. Cl.
*G06F 21/00* (2013.01)
*G06F 3/02* (2006.01)
*G06F 21/60* (2013.01)

(52) U.S. Cl.
CPC .................................. *G06F 21/604* (2013.01)

(58) Field of Classification Search
CPC ......... G06F 21/31; G06F 21/44; G06F 21/30; G06F 21/32; G06F 21/00
USPC .......................................................... 726/22
See application file for complete search history.

(56) References Cited

U.S. PATENT DOCUMENTS

| | | | |
|---|---|---|---|
| 6,202,066 B1 * | 3/2001 | Barkley et al. | 707/785 |
| 2003/0088517 A1 * | 5/2003 | Medoff | 705/59 |
| 2005/0030289 A1 * | 2/2005 | Crockett et al. | 345/168 |
| 2005/0246338 A1 * | 11/2005 | Bird | 707/9 |
| 2007/0264981 A1 * | 11/2007 | Miller | 455/414.1 |
| 2008/0049767 A1 * | 2/2008 | Koltenuk | 370/401 |
| 2008/0066093 A1 * | 3/2008 | Igoe et al. | 725/25 |
| 2008/0125079 A1 * | 5/2008 | O'Neil et al. | 455/405 |
| 2008/0246605 A1 * | 10/2008 | Pfeffer et al. | 340/540 |
| 2009/0143062 A1 * | 6/2009 | Skinner et al. | 455/420 |
| 2009/0182747 A1 * | 7/2009 | Bird et al. | 707/9 |
| 2009/0327705 A1 * | 12/2009 | Ray et al. | 713/156 |

* cited by examiner

*Primary Examiner* — Yonas Bayou

(57) ABSTRACT

A method for restricting, based on predefined user profile information, access to software executing on a computing device of a user. The method comprises the following steps. Input data is intercepted from a user input device. The input data is compared with a list of restrictions in the user profile information to determining if an action associated with the input data is prohibited. The input data is passed to the software for execution only if the action associated with the input data is not prohibited. A method for restricting, based on predefined user profile information, access to notifications generated for a user is also provided.

13 Claims, 8 Drawing Sheets

RESTRICTING USER ACCESS ON SHARED COMPUTER

The present invention relates generally to computers shared amongst a plurality of users and specifically to a system and method for restricting user access to features on the shared computer.

BACKGROUND

The proliferation of wireless data transfer technologies, including radio frequency, cellular, Wi-Fi, Bluetooth and radio frequency identification (RFID) technologies, for example, has resulted in an explosion in the number of portable devices available to consumers. Many of these portable device are being used by companies to perform data collection tasks including, inventory management, delivery tracking and the like. Accordingly, it is often necessary for many employees to use the same portable devices. However, it may be desirable to assign different permissions to different employees. Although such functionality is a common feature of traditional desktop operating systems, it is conspicuously absent from many portable operating systems.

SUMMARY

In accordance with an aspect of the present invention, there is provided a method for restricting, based on predefined user profile information, access to software executing on a computing device of a user, the method comprising the steps of: intercepting input data from a user input device; comparing the input data with a list of restrictions in the user profile information to determining if an action associated with the input data is prohibited; and passing the input data to the software for execution only if the action associated with the input data is not prohibited.

In accordance with a further aspect of the present invention, there is provided a non-transitory computer-readable medium having stored thereon instructions for restricting, based on predefined user profile information, access to software executing on a computing device of a user, the instructions, when executed by a processor, operable to: intercept input data from a user input device; compare the input data with a list of restrictions in the user profile information to determining if an action associated with the input data is prohibited; and pass the input data to the software for execution only if the action associated with the input data is not prohibited.

In accordance with yet a further aspect of the present invention, there is provided a method for establishing a user profile for use in restricting a user's access to a computing device, the method comprising the steps of: determining a list of restricted applications, control panels and tabs; determining a list of restricted functionality of the computing device; and creating a profile file in a schema-based description language, the profile file configured to represent the list of restricted applications, control panels and tabs and the list of restricted functionality of the computing device for the user.

In accordance with yet a further aspect of the present invention, there is provided a non-transitory computer-readable medium having stored thereon instructions for restricting access to a computing device based on a user profile, the instructions operable by a processor to: load user profile information from the user profile, the user profile information including a list of restricted actions using a schema-based description language; modify a registry on the computing device to implement at least a portion of the restricted actions; and monitor activity on the computing device to implement a remaining portions of the restricted actions.

In accordance with yet a further aspect of the present invention, there is provided a method for displaying search results for a search conducted on a computing device having a plurality of memory stores, the search based on one of a plurality of predefined search criteria definitions, the method comprising the steps of: presenting the plurality of predefined search criteria definitions to a user; in response to a user selecting one of the plurality of predefined search criteria definitions, searching each of the plurality of memory stores to determine a search result; consolidating the search results; and displaying the consolidated search results to the user in a single window on a screen of the computing device.

BRIEF DESCRIPTION OF THE DRAWINGS

Embodiments of the invention will now be described by way of example only with reference to the following drawings in which.

DETAILED DESCRIPTION OF THE PREFERRED EMBODIMENTS

Figure 1:
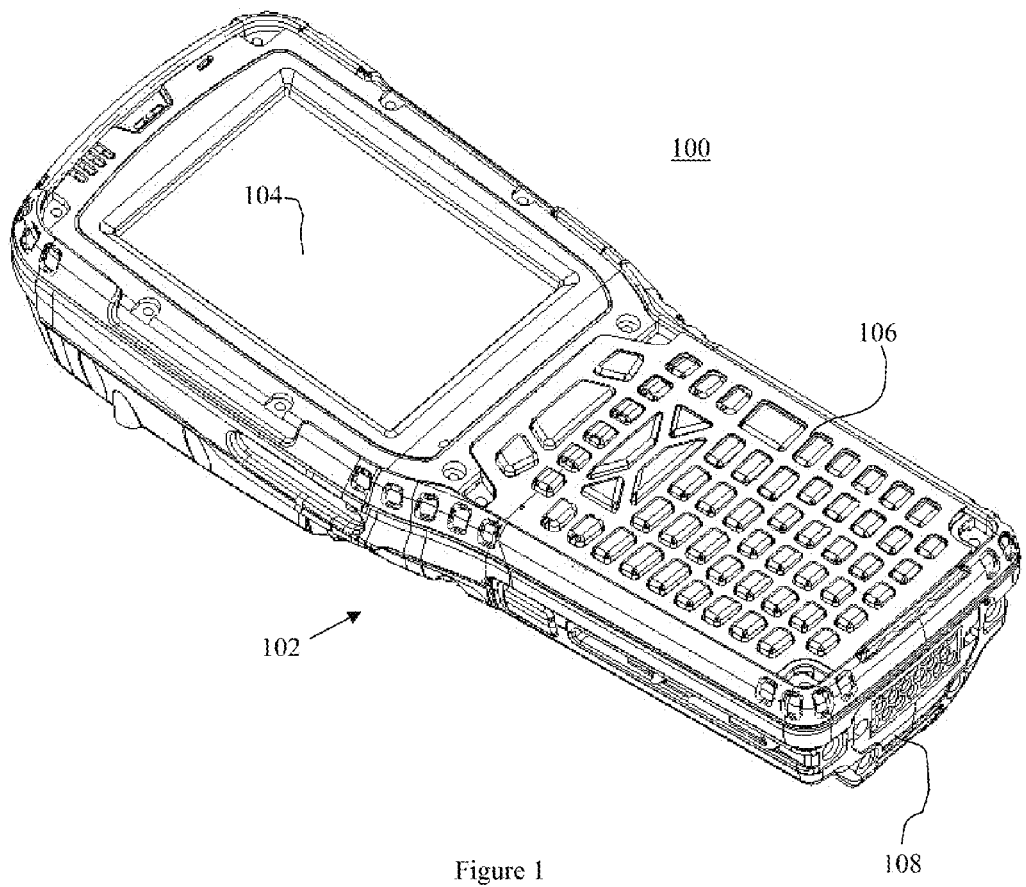
FIG. 1 is a drawing illustrating a sample mobile computer.

For convenience, like numerals in the description refer to like structures in the drawings. Referring to FIG. 1 a mobile computer (herein referred to variously and interchangeably as a handheld device, a handheld computer, or a mobile device) is shown generally by numeral 100. The mobile computer 100 comprises a main body 102, a display 104, a keyboard 106 and a battery compartment 108 for housing a rechargeable battery (not shown). Additionally, in the present embodiment, the mobile computer 100 has the capability of wireless communicating data and/or voice, to and from servers as well as data acquisition sources within a communication network.

Figure 2:
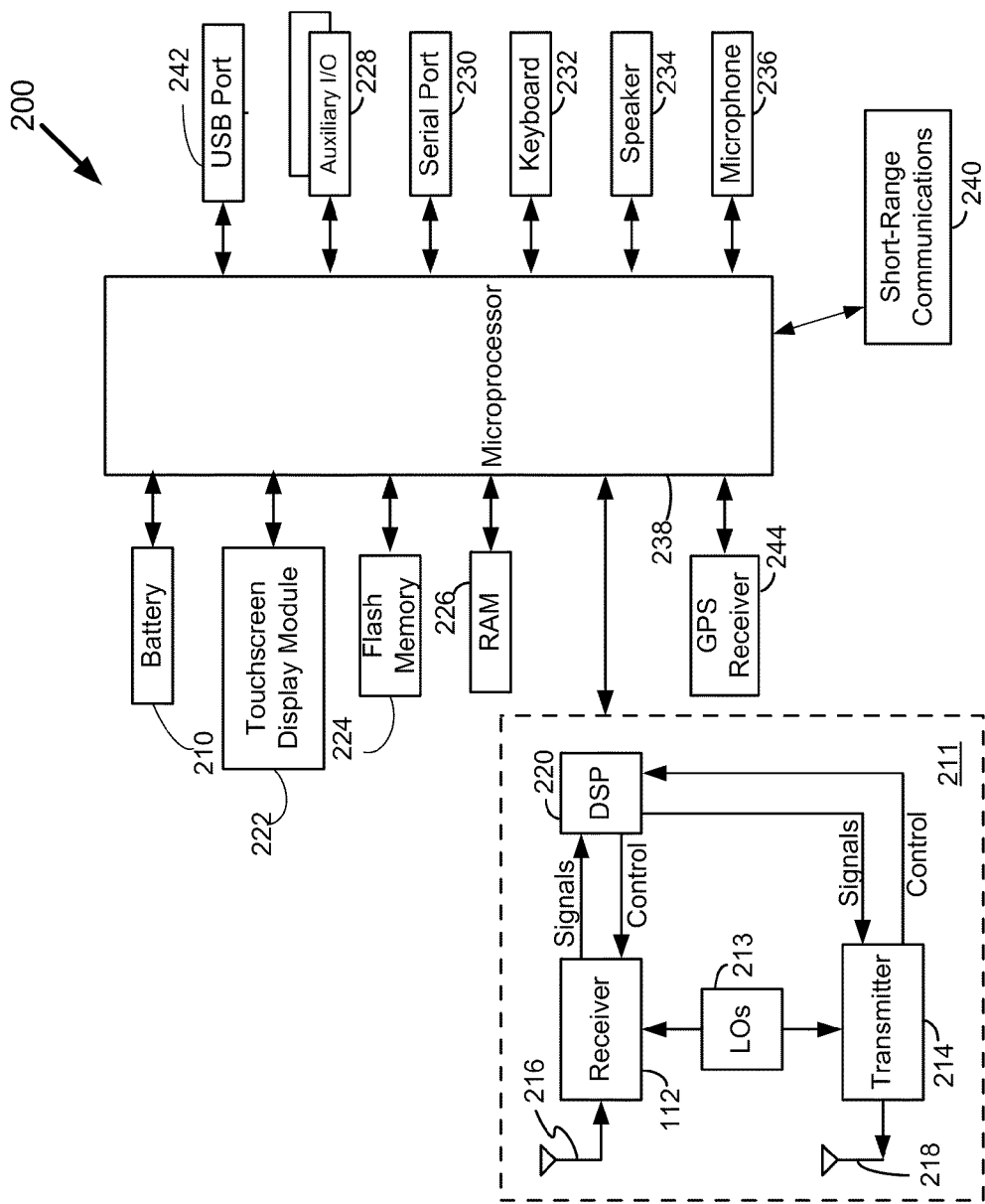
FIG. 2 is a block diagram illustrating a sample configuration of the mobile computer.

Referring to FIG. 2, a block diagram illustrating a sample configuration of the mobile computer shown generally by numeral 100. The mobile computer 100 includes a microprocessor 238, which controls general operation of the mobile computer 100. The microprocessor 238 also interacts with functional device subsystems such as a communication subsystem 211, display module 222, a flash memory 224, random access memory (RAM) 226, auxiliary input/output (I/O) subsystems 228, serial port 230, keyboard 232, speaker 234, microphone 236, short-range communications subsystem 240 such as Bluetooth™ for example, and Universal Serial Bus (USB) expansion port 242 for peripherals. The mobile computer 100 may include a power source 210, such as a rechargeable battery which may also be removable and replaceable from the mobile computer 100. The mobile computer 100 may also include a positioning device 244, such as a GPS receiver for example, for receiving positioning information.

The radio frequency (RF) communication subsystem 211, includes a receiver 212, a transmitter 214, and associated components, such as one or more embedded or internal antenna elements 216 and 218, local oscillators (LOs) 213, and a processing module such as a digital signal processor (DSP) 220. As will be apparent to those skilled in field of communications, the particular design of the RF communication subsystem 211 depends on the communication network in which mobile computer 100 is intended to operate, but may include communication functionalities such as radio-frequency identification (RFID), Wi-Fi WLAN based on 802.11 standards, and the like.

The display module 222 is used to visually present an application's graphical user interface (GUI) to the user. Depending on the type of mobile computer 100, the user may have access to various types of input devices, such as, for example, a scroll wheel, trackball, light pen and/or a touch sensitive screen (or touch screen).

Operating system software used by the microprocessor 238 may be stored in a persistent store such as the flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

The microprocessor 238, in addition to its operating system functions, enables execution of software applications on the mobile computer 100. A predetermined set of applications, which control basic device operations, may be installed on the mobile computer 100 during its manufacture. These basic operations typically include data and voice communication applications, for example. Additionally, applications may also be subsequently loaded onto the mobile computer 100 through the communication subsystem 211, an auxiliary I/O subsystem 228, serial port 230, USB port 242, short-range communications subsystem 240, or any other suitable subsystem, and installed by a user in RAM 226, or the persistent store 224, for execution by the microprocessor 238. Such flexibility in application installation increases the functionality of the mobile computer 100 and may provide enhanced on-device features, communication-related features, or both.

Accordingly, a kiosk mode application is loaded onto the mobile computer 100. Generally, the kiosk mode application allows an administrator to establish one or more user profiles for the handheld computer 100. The user profiles allow the administrator to restrict access on the handheld computer 100 for different users. The user profiles are stored in one or more schema-based description documents. In the present embodiment, the schema based description documents are extensible markup language (XML) documents. During operation of the kiosk mode application, a user "logs on" by entering a user name and, optionally, a password. The kiosk mode application loads a corresponding user profile. An active service restricts access to the handheld computer 100 based on the loaded user profile. Operation of the kiosk mode application is provided in detail below.

Figure 3:
FIG. 3 is a screenshot of an administration main menu.

The following describes administration of the kiosk mode. Upon activation of the kiosk mode application, an administrator is presented with an administration main menu. Referring to FIG. 3, a screenshot of the administration main menu (or simply main menu) is illustrated generally by numeral 300. The main menu 300 includes the following sections: administrator password 302; shell access 304; restrictions 306; setting 307 and Export to File 308. If a setting or restriction is configured and no administrator password has been set then an "Admin Password Not Set" label is displayed on the main menu 300. Once a password has been set then the label is removed.

Figure 4:
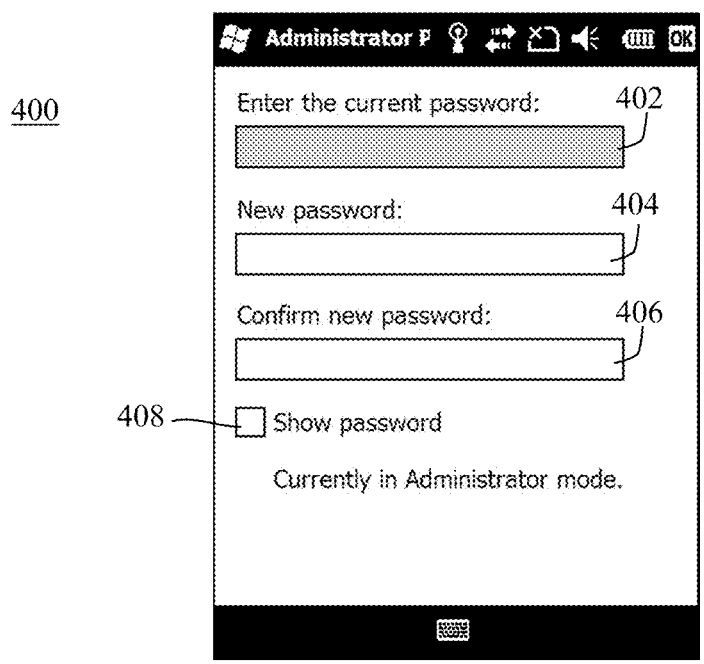
FIG. 4 is a screenshot of a password setup screen.

If the user selects the administrator password option from the main menu 300, the user is presented with a password entry screen. Referring to FIG. 4, a screenshot of the password entry screen is illustrated generally by numeral 400. As is standard in the art, the user is provided with a current password field 402; a new password field 404 and a password verification field 406. A show password check box 408 is provided. If the show password check box 408 is checked, characters typed into the new password field 404 and the password verification field 406 are displayed. If the show password check box 408 is unchecked, characters typed into the new password field 404 and the password verification field 406 are obfuscated.

The user can modify an existing password by entering it in the current password field 402 and a new password in the new password field 404 and the password verification field 406. If existing password is correct and the new password field 404 and the password verification field 406 match, then the password is successfully changed. To enter a new password, the user leaves the current password field blank.

Figure 5A:
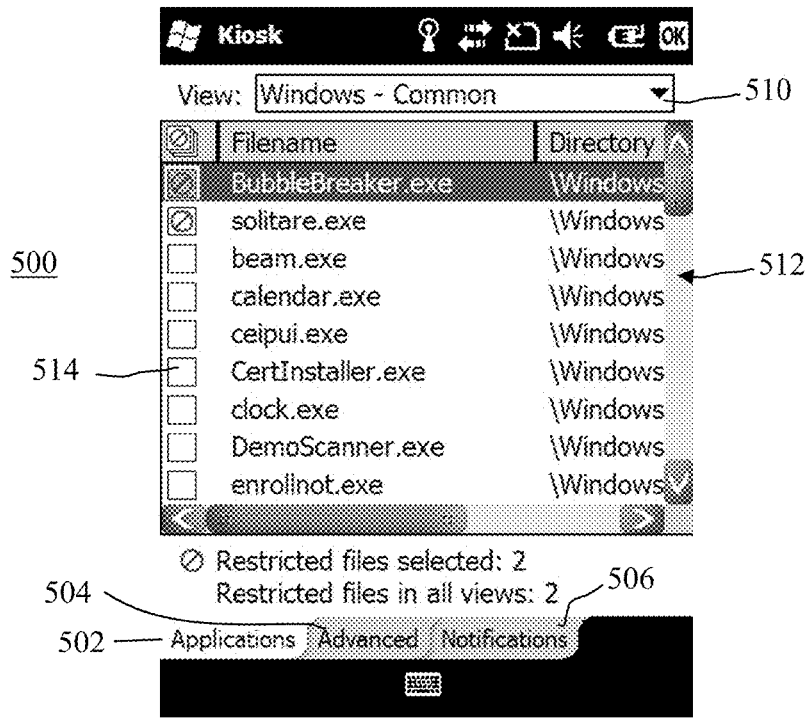
FIG. 5a is a screenshot of a restrictions screen with an applications tab selected.

The restrictions section 306 of the main menu 300 provides a list of items that are available to users by default. Referring to FIG. 5a, a screenshot of a restrictions screen accessed by the restrictions section 306 is illustrated generally by numeral 500. The administrator is presented with three tabs in the restrictions screen 300: an applications tab 502; an advanced tab 504; and a notifications tab 506. The present screenshot illustrates the restrictions screen 300 with the applications tab 502 selected.

A drop down menu 510 is provided to present the administrator with a number of different predefined application selection profiles. When the administrator selects one of the application selection profiles, a corresponding filter is applied to a search engine. The results of the search engine are consolidated and presented to the administrator in a selection window 512. For example, one of the application selection profiles is "Windows-All". This profile returns a list of all available applications on the handheld computer 100. Accordingly, the search engine searches each of the persistent storage elements on the handheld computer 100 and consolidates the results for display in the selection window.

Other examples of application selection profiles include profiles for: all applications on a given drive; a list of suggested applications to restrict; a list of commonly restricted applications; a list of previously restricted applications; and a list of currently restricted applications. In order to facilitate some of these lists, intelligence can be programmed into the kiosk mode application to track data and maintain statistics as required by the particular profile.

Applications can be restricted by checking a corresponding restriction check box 514 in the selection window 512. Restricted applications are not made available to the user.

Figure 5B:
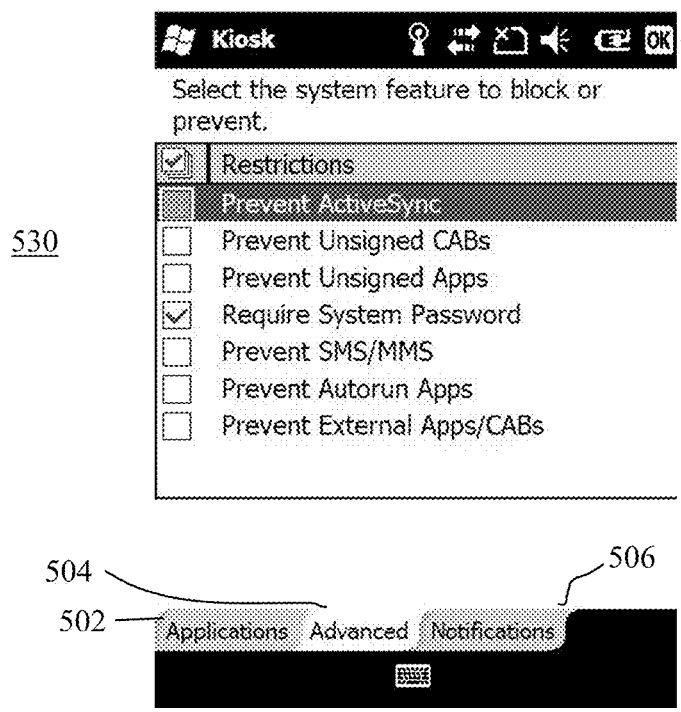
FIG. 5b is a screenshot of the restrictions screen with an advanced tab selected.

Referring to FIG. 5b, a screenshot illustrating the restrictions screen 500 with the advanced tab 504 selected is shown generally by numeral 530. In the advanced tab 504, the administrator is provided with further features, such as enabling and disabling the ability to: autorun applications; use unsigned applications; use unsigned archive files; require a system password; use external applications; use external archive files; use specific features of the phone; and synchronize with a desktop or server.

Figure 5C:
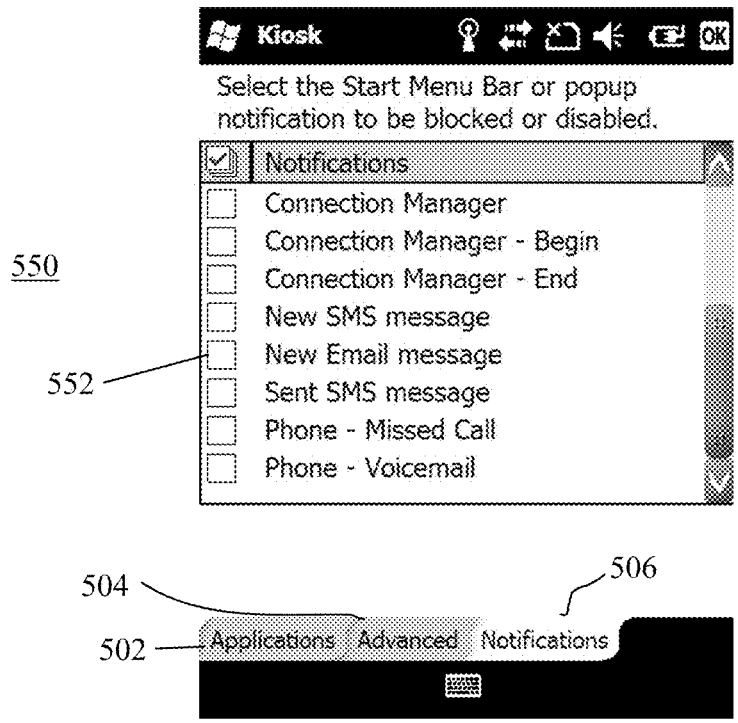
FIG. 5c is a screenshot of the restrictions screen with a notifications tab selected.

Referring to FIG. 5c, a screenshot illustrating the restrictions screen 500 with the notifications tab 506 selected is shown generally by numeral 550. The notifications section 550 provides a list of configurable settings for limiting user access to notifications and includes a check box 552 for enabling and disabling notification.

Optionally, a drop down list box (not shown) can be provided for identifying a plurality of predefined notification configurations. Examples of predefined configurations include: display all pop-up notifications to the user as well as allowing access to a "Settings" link in the notification; display all pop-up notifications to the user but blocking access to the "Settings" link; blocking all pop-up notifications; blocking all phone pop-up notifications are blocked when the phone has been disabled; block all SMS/text pop-up notifications when the phone has been disabled; block all Wi-Fi pop-up notifications. It will be apparent to a person of ordinary skill in the art that these configurations are exemplary and can vary depending on the implementation.

An "edit" button can be provided that allows the administrator to access a program wizard configured to edit the details of a selected one of the predefined notification configurations. The administrator may also be provided with the option to save the modified notification configuration as a custom notification configuration. Also optionally, a "create new" button can be provided that allows the administrator to access a program wizard configured to add a new, custom notification configuration.

Figure 6A:
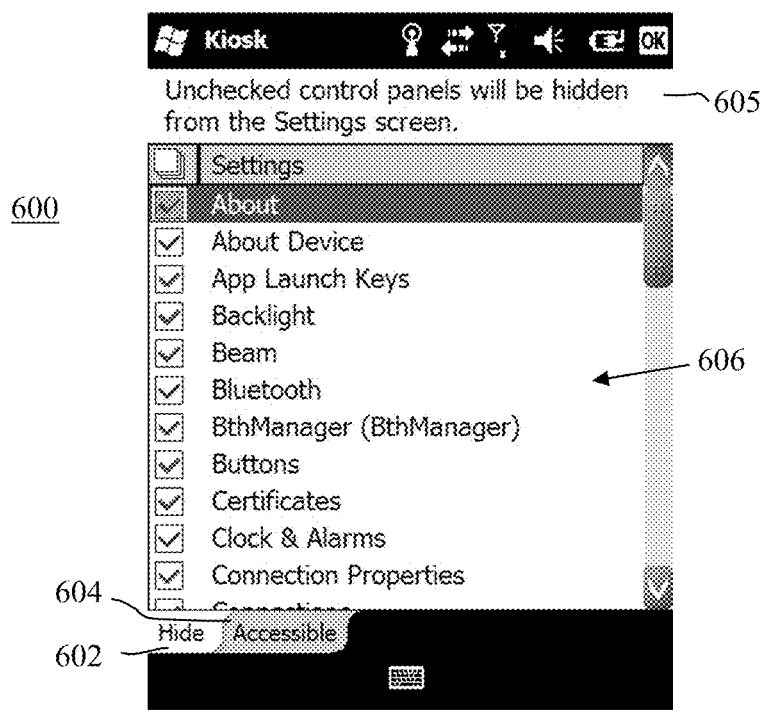
FIG. 6a is a screenshot of a settings screen with a hide tab selected.

The settings section 307 of the main menu 300 provides a list of configurable settings for the applications that the administrator has made available via control panels. For the purpose of the present description, a control panel is a graphical user interface (GUI) that allows users to view and manipulate system and application settings and controls via a corresponding applet. Referring to FIG. 6a, a screenshot of a settings screen accessed by the settings section 307 is illustrated generally by numeral 600. The administrator is presented with two tabs in the settings screen 600: a hide tab 602; and an accessible tab 604. The present screenshot illustrates the settings screen 600 with the hide tab 302 selected.

The hide tab 602 is used for defining control panels and tabs that can be hidden from the user. In the present embodiment, the hide tab 602 includes a label 605 that describes the functionality of the hide tab 600. For example, in the present embodiment, the label 605 displays the message "Unchecked control panels will be hidden from the Settings screen".

In order to facilitate selection of the control panels and tabs to be hidden, a selection window 606 is provided. The selection window 606 displays a list of all control panels that can be hidden along with their corresponding tabs in a tree like structure. That is, the list includes a list of all the control panels. Each control panel in the list can be expanded to display the corresponding tabs, if any. The administrator has the option of hiding an entire control panel or specific tabs within the control panel. The selection window 604 also identifies control panels and/or tabs that cannot be hidden. In the present embodiment, a control panel or tab that cannot be hidden is greyed out so the administrator understands it cannot be changed.

Each of the control panels and tabs has a corresponding check box for allowing the administrator to make it hidden or visible. If the administrator selects a control panel to hide, then the whole control panel, including all tabs, is hidden. If the administrator selects specific tabs of a control panel to hide, then only those tabs are hidden and the control panel is made available to the user.

Optionally, an undo feature is provided which maintains a history of the control panels and tabs that have been selected and cleared. This feature allows the administrator to undo recent changes that may have been made in error, for example.

Figure 6B:
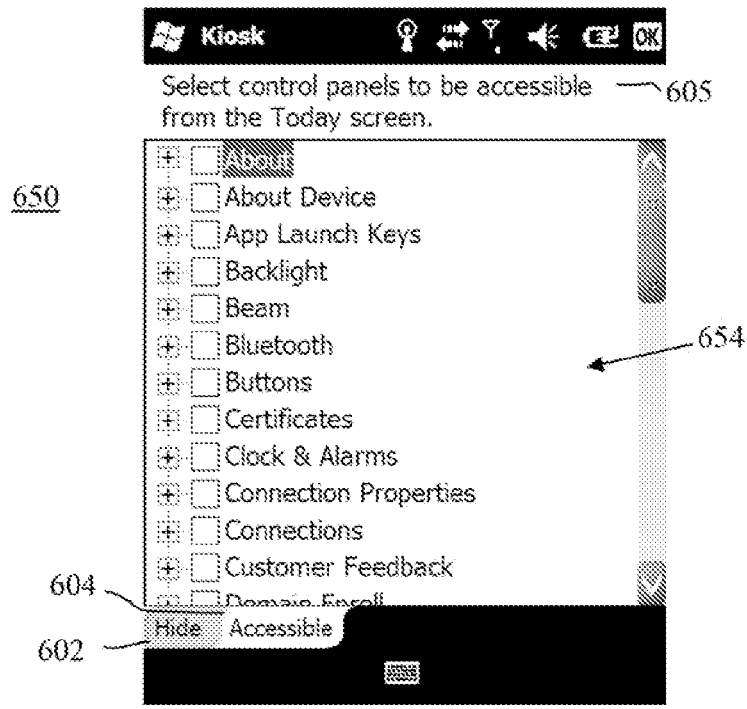
FIG. 6b is a screenshot of the settings screen with an accessible tab selected.

Referring to FIG. 6b, a screenshot of the settings screen 600 with the accessible tab 602 selected is illustrated generally by numeral 650. The settings screen 650 is used to allow the administrator to define which control panel along with which tabs will be accessible from a main screen of a user-interface (UI) shell. In the present embodiment the accessible tab 650 includes a label to describe the purpose of the accessible tab 650. For example, in the present embodiment the label display the text "Select control panels to be accessible from the Today screen".

In order to facilitate selection of the control panels and tabs to be made accessible on the main screen, a selection window 654 is provided. The selection window 654 displays a list of all control panels that can be made accessible on the main screen along with their corresponding tabs in a tree like structure. In the present embodiment, the list includes all the control panels not hidden. Each control panel in the list can be expanded to display the corresponding, non-hidden tabs, if any. The administrator has the option of making an entire applet or specific tabs within the applet accessible from the main screen. The selection window 654 also identifies a control panel and/or tabs that cannot be made accessible from the main screen. In the present embodiment, an applet or tab that cannot be made accessible from the main screen is greyed out so the administrator understands it cannot be changed.

Each of the control panels and tabs has a corresponding check box for allowing to the administrator to make it accessible from the main screen. If the administrator selects a control panel, then the control panel is made accessible from the main screen. If the administrator selects specific tabs of the control panel, then access to these tabs directly is made accessible from the main screen.

Optionally, an undo feature is provided which maintains a history of the applets and tabs that have been selected and cleared. This feature allows the administrator to undo recent changes in case that may have been made in error, for example.

Figure 7A:
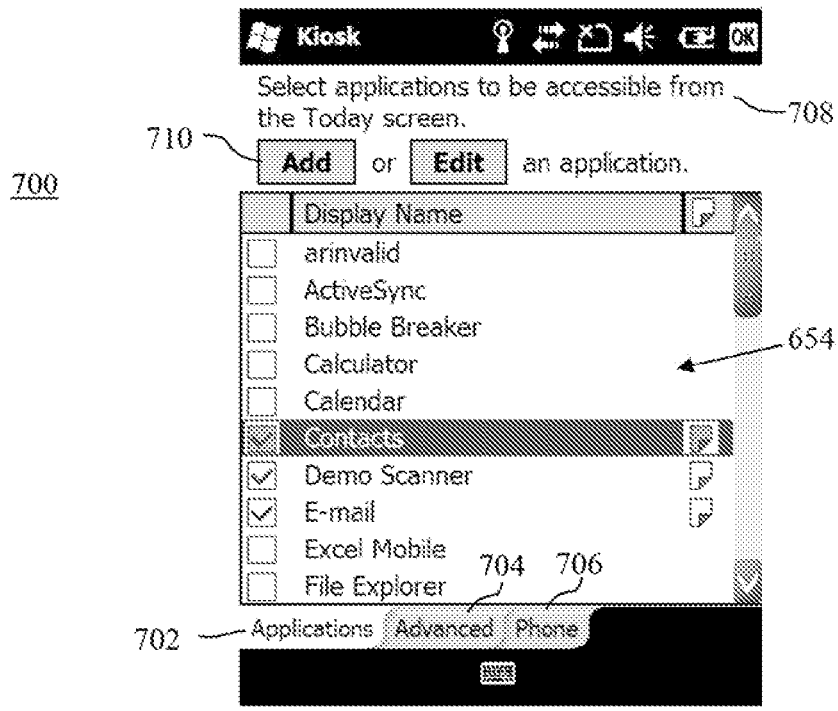
FIG. 7a is a screenshot of a user interface (UI) screen with an applications tab selected.

The shell access 304 section from the main menu 300 provides the administrator with the ability to select applications that are to be accessible from a main screen of the UI Shell. Referring to FIG. 7a, a screenshot of a UI screen accessed by shell access section 304 is illustrated generally by numeral 700. The administrator is presented with three tabs in the UI screen 700: an applications tab 702; an advanced tab 704; and a phone tab 706. The present screenshot illustrates the UI screen with the applications tab 502 selected.

The UI screen 700 includes a label 708 that describes the functionality of the UI screen 700 when the applications tab 702 is selected. For example, in the present embodiment, the label 708 displays the text "Select applications to be accessible from Today Screen".

In order to facilitate selection of the applications be made accessible on the main screen, a selection window 704 is provided. The selection window 704 displays a list 706 of all the unrestricted applications installed on the handheld computer 100. Each of the applications in the list 706 has a corresponding text box to allow to the administrator to make it accessible from the main screen.

Figure 7B:
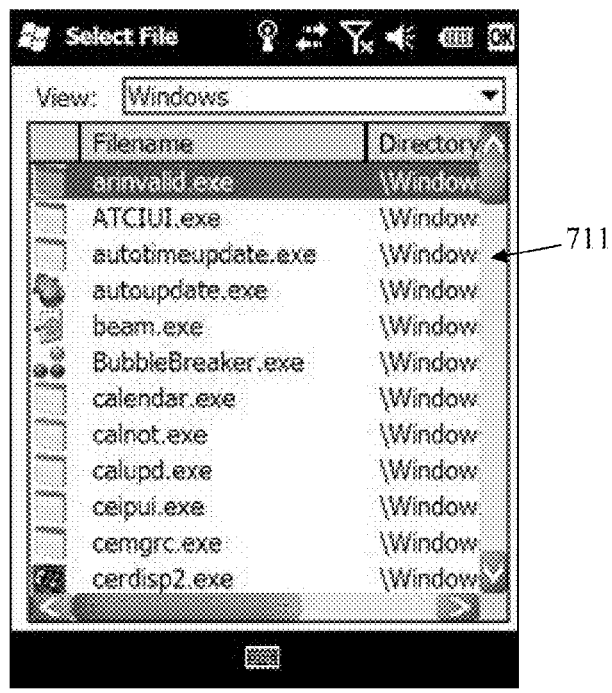
FIG. 7b is a screenshot of an add window for the UI screen.
Figure 7C:
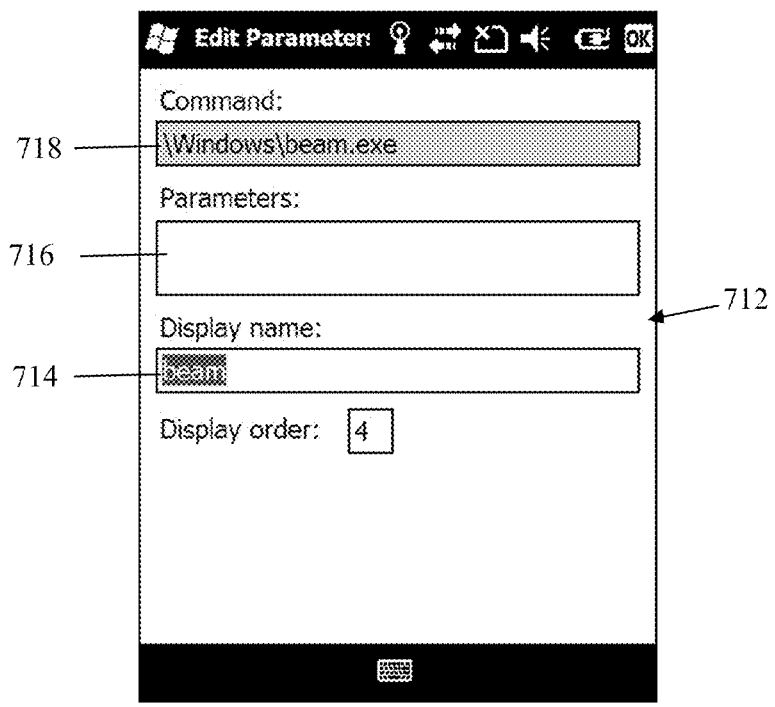
FIG. 7c is a screenshot of a parameter window for the UI screen.

An add button 710 is provided to allow the administrator to search for and install a new application on the handheld computer 100. Upon selection of the add button, the administrator is presented with an add window 711, shown in FIG. 7b. The add window 711 provides a list of all applications available on the handheld computer. Upon selection of a new application to install, the administrator is presented with a parameter window 712, shown in FIG. 7c. The parameter window 712 includes a display name field 714, an parameters field 716, and a command field 718 for the new application.

The display name field 714 is an editable field which is prefilled with the name of an executable file for the application selected by the administrator. The parameters field 716 allows the administrator to customize switches for executing the application. The command field 718 is prefilled with a path and name of the executable file for the new application. The command field 718 is editable and the administrator has the ability to add command line switches and arguments. Optionally, an icon field (not shown) can be provided to allow the user to select an image file that is to be used as an icon for the application that is being added. This option opens an explorer window for the administrator to select the image file. If nothing is specified then a default icon for the application is used.

Figure 7D:
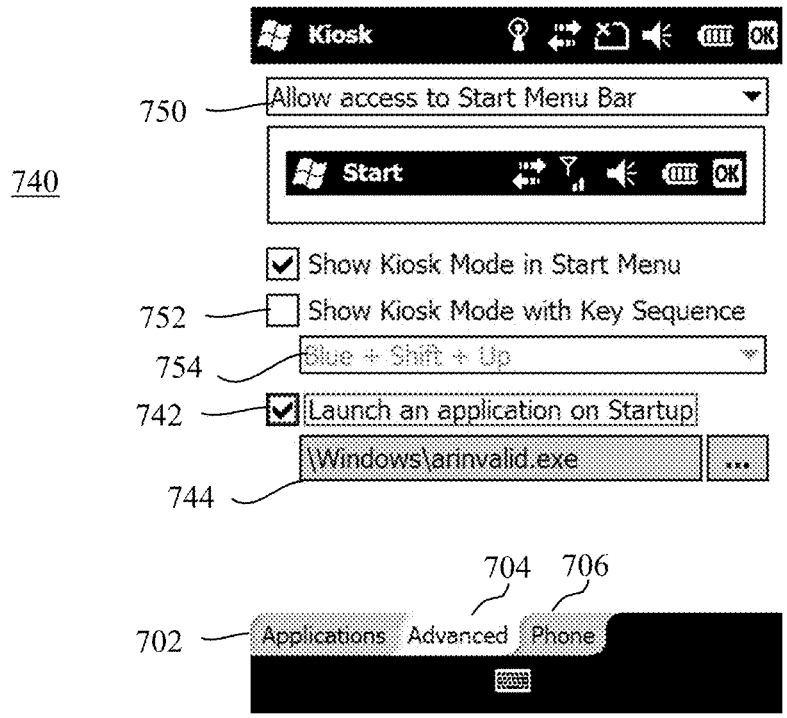
FIG. 7d is a screenshot of the UI screen with an advanced tab selected.

Referring to FIG. 7d, a screenshot of the UI screen with the advanced tab 704 selected is illustrated generally by numeral 740. The UI screen 740 provides the user with various options for enhancing the main screen. For example, a check box 742 is provided for allowing the administrator to select an application to launch when the handheld computer 100 starts up. A file selection box 744 is provided to select the desired application to launch.

As another example, a drop down list 752 and input selection 754 are provided for selecting which hotkeys facilitate switching between users. The input selection 754 is used to enable hotkey switching between users and the drop down list 752 is used to select a hotkey sequence to affect the switching. Accordingly, if a user of the handheld device selects the hotkey sequence, the user will be able to change users or enter administration mode, subject to any passwords that may be set.

As another example, a drop down list (not shown) and input selection (not shown) can be provided for selecting which hotkeys facilitate switching between applications. The input selection is used to enable hotkey switching between applications and the drop down list is used to select the hotkey combination to affect the switching.

As other examples, further input selections 750 are provided to enable and disable access to a start menu; enable and disable access to the start bar, enable and disable an administrator password prompt for the start menu.

Figure 7E:
FIG. 7e is a screenshot of the UI screen with a phone tab selected.
Figure 7E:
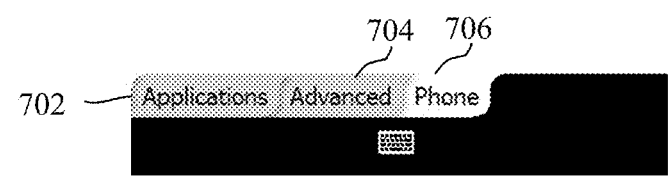

Referring to FIG. 7e, a screenshot of the UI screen with the phone tab 704 selected is illustrated generally by numeral 760. The UI screen 760 provides the user with options for enabling and disabling access to the phone features of the mobile computer 100. For example, a check box 762 is provided that allows the administrator to either hide or show a phone dialer in the start menu. Further, a drop-down list 764 provides the user with a list of preconfigured options for enable and disabling various features of the option. Optionally, the preconfigured options can be modified by the administrator or a plurality of individual phone features can be provided for selection.

Once the administrator has set all of the user permissions, restrictions, notifications and the like, the administrator can export them to a settings file using the export button 308 on the main menu 300. In the present embodiment, the settings file is defined using extensible mark-up language (XML) file containing all the necessary information to represent the settings defined by the administrator. The administrator is prompted for the location of where the settings file should be saved. A copy of the settings file is also saved in a central repository. In addition to all the configuration settings, the setting file also includes the administrator's password. In the present embodiment the password is encrypted. The administrator's password in included in the settings file for present embodiment so that the settings file can be deployed on multiple devices without have to set up an administrator password on each device. Since the password is encrypted, users would not have access to the administrator password.

Although not shown, as part of the kiosk mode application, the administrator can associate users with corresponding setting files. One setting file can be associated with each username or a plurality of usernames can be associated with each setting file. The administrator can set passwords for each of the usernames, if desired.

Once the profile file has been defined, it can be implemented by the active service. When the user logs on, a profile file corresponding to the entered username is loaded by the active service. Some of the restricted notifications listed in the profile file can be implemented by modifying the registry. In order to facilitate this, the active service includes a list of all notifications that require registry modification and the corresponding registry value. The active service parses the profile file to determine if any of the notifications in the profile file are on the active service list. For each notification in the profile file that matches a notification in the active service list, the registry is modified accordingly.

The active service also configures the UI shell as defined in the profile file. That is, all of the applications selected in the UI shell screen 700 are included on the main screen of the UI shell. The applications or control panels that are identified in the profile file as "hidden" are not displayed.

The remaining restrictions are implemented dynamically. Restrictions that can be implemented using built-in control panel or application settings are implemented when the application or control panel is executed. That is, when the user selects a control panel or application, the active service checks the profile file to determine whether or not the administrator has imposed any restrictions. If no restrictions exist, the control panel or application executes as normal. However, if the administrator has imposed restrictions, the restrictions are imposed on the control panel or application. For example, if the administrator has restricted access to some of a control panel's tabs, the active service instructs the control panel to execute without displaying the restricted tabs.

Notifications that cannot be restricted by making registry changes are implemented by blocking the messages they automatically generate, referred to as pop-up messages. In the present embodiment, the pop-up messages are blocked by immediately hiding or suppressing them. Thus, for example, if a text message is received, the system is configured to notify the user of the new message by presenting a pop-up message. The active service monitors the systems for notification generation. When the active service detects a notification, it is compared with the restricted notification in the profile file. If the notification is not restricted, the active service does not interfere with the pop-up notification. However, if the notification is restricted, the active service suppresses or hides the notification as soon as possible.

Further, as previously described, user access to specific features, such as access to the start bar or access to the phone features for example, can be blocked. These restrictions are implemented by blocking user input. Thus, for example, on a touch screen, if a user attempts to access a restricted feature by touching an associated icon, nothing will happen. As another example, if a user attempts to press a restricted key, such as a phone dial key, nothing will happen. However, a user may not realize that access to the selected feature is prohibited and may, instead, believe that the handheld computer 100 is malfunctioning. Accordingly, an optional access denied message can be displayed to the user to indicate that access to the selected feature is prohibited.

Blocking user input is implemented by the active service as follows. Each icon, or other visual representation of a device feature, application or control panel, is associated with a location on the screen of the handheld device 100. These locations are known in advance and programmed into the active service. Similarly, each of the keys on the keyboard is associated with one or more features of the handheld computer. Accordingly, the active service parses the profile file for notifications which block user input. Once the notifications are determined, the active service determines restricted areas of the screen and restricted keys.

During operation of the handheld computer 100, the active service hooks in to the operating system to intercept user input messages generated by the handheld computer 100. That is, each time a user provides input, that input is intercepted by the active service. If the user input message is a result of the user depressing a key the user input message is analysed to determine if it is a restricted key. If the depressed key is not restricted, the user input message is returned to the operating system, which proceeds as normal. If the depressed key is not restricted, the user input message is discarded. The active service generates a message to be displayed to the user indicating that the depressed key is restricted.

If the user input message is a result of the user attempting to access a feature on the screen, either by touch or by cursor, screen coordinates of the user input message are analysed to determine if the selected region corresponds to an icon of a restricted applet or application. If the selected region corresponds to an icon that is not restricted, the user input message is returned to the operating system, which proceeds as normal. If the selected region corresponds to an icon that is restricted, the user input message is discarded. The active service generates a message to be displayed to the user indicating that the selected applet or application is restricted.

Accordingly, it will be appreciated that the kiosk mode application provides the ability to restrict access to the mobile computer 100 for a plurality of different users. Further, the kiosk mode application allows the switching of user profiles without restarting the handheld computer 100 unless necessary. That is, upon loading of a profile file, the active service determines if any of the settings require a reboot. If no reboot is required by the change in settings then the new settings are applied and a reboot is not necessarily required when switching between different users.

In the embodiment described above, intelligence is provided in the active service to facilitate implementing restrictions defined in the profile file. That is, it is the responsibility of the active service to determine prohibited notifications, locations, and the like based on restriction settings in the profile file. In an alternate embodiment, more intelligence can be implemented by the kiosk application when setting the restrictions so that more detail is saved to the profile file. Thus, the profile file would include details about the restricted notifications, applications and screen locations, registry modifications, and the like. The active server merely implements details provided in the profile file. A hybrid of the two embodiments may also be implemented.

Although described specifically with reference to a handheld computer 100, the type of computer is irrelevant and the invention may be implemented on other devices for which the operating system does not provide different user profiles or for which the user profiles provided by the operating system are insufficient.

Therefore, although the invention has been described with reference to certain specific embodiments, various modifications thereof will be apparent to those skilled in the art without departing from the scope of the invention as defined by the appended claims.

What is claimed is:

1. A method for restricting, based on predefined user profile information, access to software executing on a computing device of a user, the method comprising:
    intercepting input data from a user input device, the input data representing a position on a screen associated with a selected icon;
    comparing the input data with a list of restrictions in the user profile information to determine if an action associated with the input data is prohibited;
    passing the input data to the software for execution when the action associated with the input data is not prohibited; and
    rendering a message indicating that the position is restricted when the input data is prohibited.

2. The method of claim 1, wherein the user profile information is different for different ones of a plurality of different users.

3. The method of claim 1, wherein the position on the screen is selected by touching a desired position on a touchscreen of the computing device.

4. The method of claim 1, wherein comparing the input data with a list of restrictions in the user profile information comprises comparing coordinates of the position with restricted positions listed in the user profile information.

5. The method of claim 1, wherein comparing the input data with a list of restrictions in the user profile information comprises comparing coordinates of the position with positions associated with restricted actions listed in the user profile information.

6. A non-transitory computer-readable medium having stored thereon instructions for restricting, based on predefined user profile information, access to software executing on a computing device of a user, the instructions, when executed by a processor, operable to:
    intercept input data from a user input device, the input data representing a position on a screen associated with a selected icon;
    compare the input data with a list of restrictions in the user profile information to determining if an action associated with the input data is prohibited;
    pass the input data to the software for execution when the action associated with the input data is not prohibited; and
    render a message indicating that the position is restricted when the input data is prohibited.

7. The non-transitory computer-readable medium of claim 6, wherein the user profile information is different for different ones of a plurality of different users.

8. The non-transitory computer-readable medium of claim 6, wherein the position on the screen is selected by touching a desired position on a touchscreen of a computing device.

9. The non-transitory computer-readable medium of claim 6, wherein the instructions to compare the input data with a list of restrictions in the user profile information comprises instructions to compare coordinates of the position with restricted positions listed in the user profile information.

10. The non-transitory computer-readable medium of claim 6, wherein the instructions to compare the input data with a list of restrictions in the user profile information comprises instructions to compare coordinates of the position with positions associated with restricted actions listed in the user profile information.

11. A non-transitory computer-readable medium having stored thereon instructions for restricting, based on predefined user profile information, access to notifications generated for a user, the instructions, when executed by a processor of a device, operable to:

monitor, on the device, the notifications for the user;

compare, on the device, the notifications with a list of restrictions in the user profile information set for a user of the device by a person other than the user, to determine if an action associated with the notification is prohibited;

supress, on the device, the notification when the action associated with the notification is prohibited; and render the notification on the device when the action associated with the notification is not prohibited.

12. The non-transitory computer-readable medium of claim 11, wherein the instructions to compare the notifications with a list of restrictions in the user profile information comprises instructions to compare the notifications with restricted notifications listed in the user profile information.

13. The non-transitory computer-readable medium of claim 11, wherein the instructions to compare the notifications with a list of restrictions in the user profile information comprises instructions to compare the notifications with a list of notifications associated with restricted actions listed in the user profile information.

* * * * *